J. W. MURRAY.
FILLER FOR ICE CREAM CONES.
APPLICATION FILED JAN. 31, 1911.

1,045,166.

Patented Nov. 26, 1912.
2 SHEETS—SHEET 1.

Witnesses
Fenton S Belt

Inventor
James W. Murray
By Victor J. Evans
Attorney

J. W. MURRAY.
FILLER FOR ICE CREAM CONES.
APPLICATION FILED JAN. 31, 1911.
1,045,166.
Patented Nov. 26, 1912.
2 SHEETS—SHEET 2.
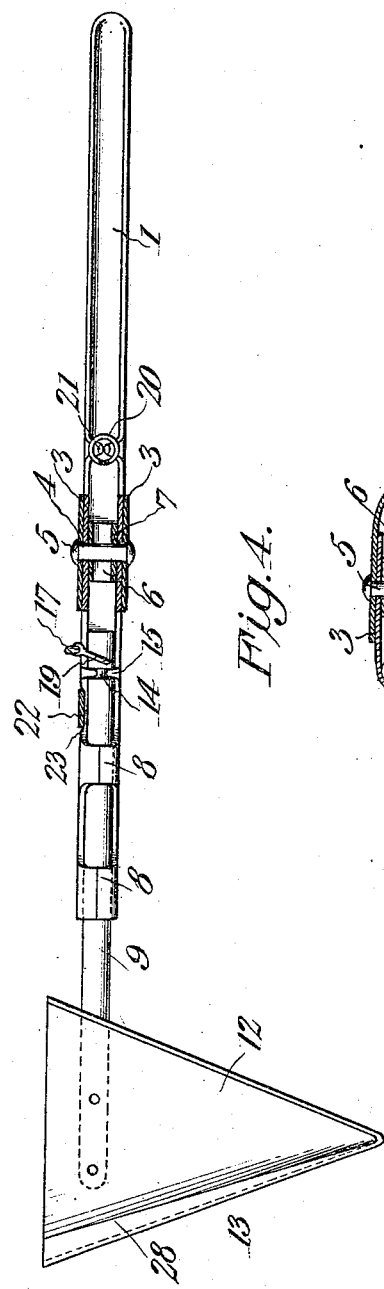
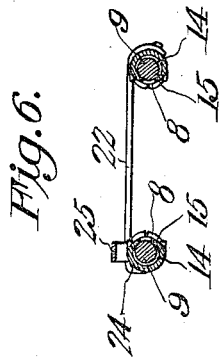
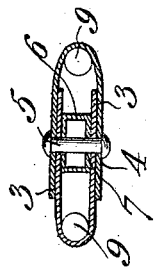
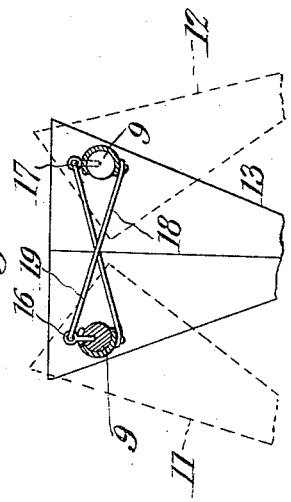
Inventor
James W. Murray
By Victor J. Evans
Attorney
Witnesses

UNITED STATES PATENT OFFICE.

JAMES W. MURRAY, OF FORT McPHERSON, GEORGIA.

FILLER FOR ICE-CREAM CONES.

1,045,166.  Specification of Letters Patent.  Patented Nov. 26, 1912.

Application filed January 31, 1911. Serial No. 605,719.

*To all whom it may concern:*

Be it known that I, JAMES W. MURRAY, a citizen of the United States, residing at Fort McPherson, in the county of Fulton and State of Georgia, have invented new and useful Improvements in Fillers for Ice-Cream Cones, of which the following is a specification.

This invention relates to fillers for ice cream cones and the object of the invention is the provision of a simple, conveniently operated and handy tool whereby ice cream may be dipped from the can or other receptacle, molded into proper form to be received by the cone and readily discharged.

A further object of the invention is the provision of a cone filler having means to separate the separate sections of a cup whereby the cream may be discharged therefrom and to simultaneously and automatically rotate the cup arms, whereby the small ends thereof may be separated a sufficient distance to permit the passage of the large end of the cream cone contained therein.

A still further object of the invention is the provision of means for locking the cup sections in closed operative position.

Further objects of the invention will appear as the following specific description is read in connection with the accompanying drawings, which form a part of this application, and in which:—

Figure 1:
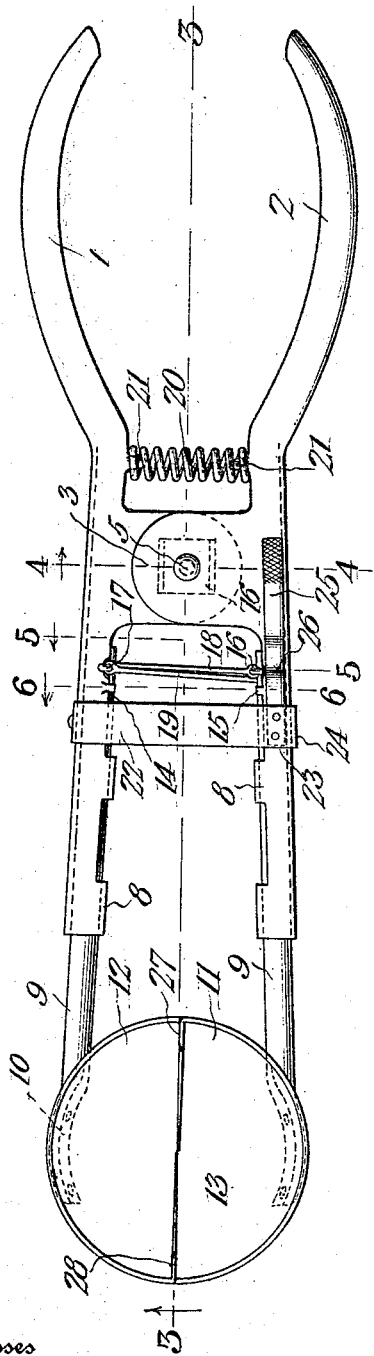
Figure 2:
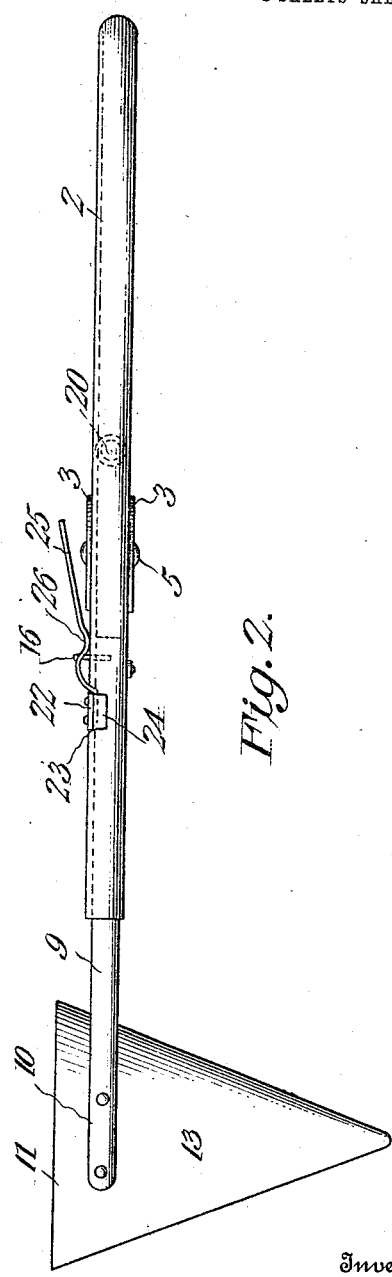

Figure 1 is a top plan view. Fig. 2 is a side elevation. Fig. 3 is a central longitudinal section on the line 3—3 of Fig. 1. Fig. 4 is a transverse section on the line 4—4 of Fig. 1. Fig. 5 is a similar view on the line 5—5 of Fig. 1. Fig. 6 is a similar view on the line 6—6 of Fig. 1.

Referring more particularly to the drawings, 1 and 2 represent the handles of the device which are preferably U-shaped in cross section. The outer ends of the handles are bowed so as to form the proper gripping surface and intermediate the length thereof the separate flanges of the handle members are provided with projecting ears 3 which overlap each other and are apertured at 4 to receive the pivoting bolt 5 for pivotally connecting the handle members together. The space between the ears is occupied by a section of a square tube 6 having an aperture 7 therein to permit the passage of the bolt and this tube holds the parts in separated relation and prevents lost motion between the handles.

Between the flanges in the outer ends of the handle members are bearings 8 in which are journaled the cup supporting arms 9 having their outer ends curved at 10 to receive the separate halves 11 and 12 of the cone shaped cup 13. The arms 9 are circular in cross section and at their inner ends are provided with grooves 14 into which are placed the fingers 15 formed from the upper flanges and bent into operative position after the shafts are properly positioned.

Adjacent the inner ends of the shafts there are threaded into the shafts the eyes 16 and 17. The eye 16 is connected to the handle 1 by a link 18 while the eye 17 is connected to the handle member 2 by a link 19, so that when the inner ends of the handle members are squeezed together and the outer ends thereby separated the links will pull upon the eyes and rotate the shafts or arms 9 in their bearings 8. The separate halves of the cup 13 are kept in engagement with each other by means of a coil spring 20 which is held in the rear of the ears 3 upon lateral projections 21 formed by bending up lateral extensions of the handle members. The jaw members are locked together by means of a spring bar 22 which is secured to the handle member 1 forward of the pivotal ears and has its opposite end lying in a recess 23 and has a depending flange 24 to overhang the member 2. Secured to the under side of the free end of the bar 22 and lying substantially parallel with the handle member 2 is an operating lever 25 which is bent into a compound curve so as to form a fulcrum point 26 which bears upon the top of the handle member 2 so that when the free end of the lever is depressed the free end of the bar 22 will be carried out of the recess and the depending flange disengaged from the handle members 2, whereby the cup sections may be separated.

The cup sections 11 and 12 each comprises half of a hollow inverted cone and each have inwardly extended flanges 27 and 28 which, when the sections are together, are upon opposite sides of the cup form and will be embedded in the cream dipped therein so that when the arms and sections are separated the flange 27 will loosen the cream in the section 12 while the flange 28 will loosen the cream in the section 11. In the operation of the device the spring 20 normally keeps the sections of the cup together and the spring member locks them in such a position that they cannot separate when being used in hard cream. After the cup has been dipped full the jaws are separated by first releasing the spring bar in the manner described and pressing the handle members together against the tension of the spring. This action separates the arms 9 and the cup sections so as to release the cream in said sections. However, as the large end of the cream cone will be unable to pass the small end of the cup sections it is necessary that these small ends be turned outwardly. The links 18 and 19 are therefore provided so that as the outer ends of the handle members are separated the links will pull upon the eyes and turn the arms in their bearings a sufficient distance to separate the lower or small end of the cone sections a distance sufficient to permit the passage of the large end. Thus the cream cone may be formed and released for deposit into its cone-shaped receptacle.

Having thus described the invention, what I claim as new is:—

1. In combination a pair of pivoted members, coacting cup sections carried by said members, means to lock the cup sections together, said means comprising a transverse bar, actuating means connected to the free end of said bar and having a portion thereof bent to form a fulcrum point.

2. In combination a pair of pivoted members, arms rotatably mounted on said members, a pair of cup sections carried by said arms, means for holding said cup sections normally together, means to operate the said sections, means acting in the operation of said sections to automatically rotate the arms and cause the small ends of the sections to operate at a greater speed than the large ends, said means comprising closed links positioned transversely of the handle and having one end secured to the said arms while the other end is secured to the bearing members of the arms.

3. In combination a pair of pivoted members, arms rotatably mounted on said members, a pair of cup sections carried by said arms, means for holding said cup sections normally together, means to operate said sections, means acting in the operation of said sections to automatically rotate the arms and cause the small ends of the sections to operate at a greater speed than the large end, said arms being provided at their inner portions with grooves, fingers formed on the upper flange portion of the handle and bent into the grooves after the shafts are properly positioned.

In testimony whereof I affix my signature in presence of two witnesses.

JAMES W. MURRAY.

Witnesses:
R. D. CRUSOE,
ETTA BURCHARTT.